Figure 1:
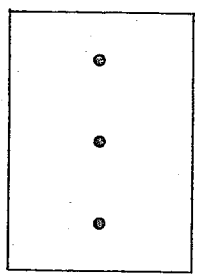
Figure 2:
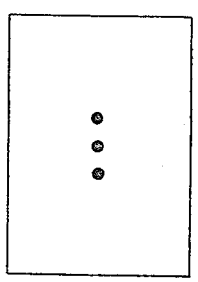
Figure 3:
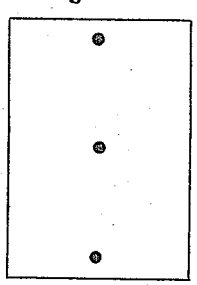
Figure 4:
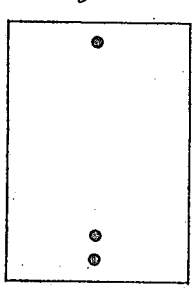
Figure 5:
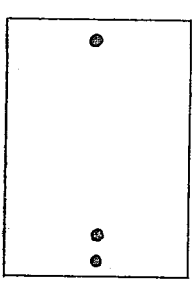
Figure 6:
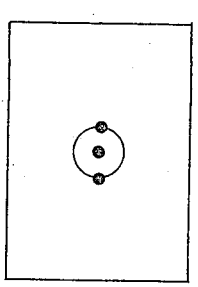
Figure 7:
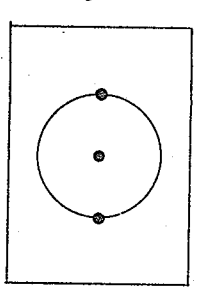
Figure 8:
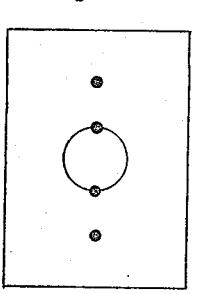
Figure 9:
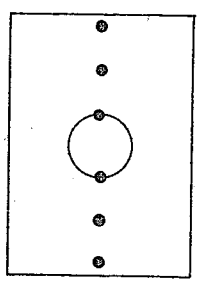
Figure 10:
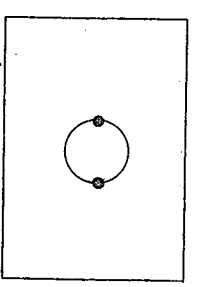
Figure 11:
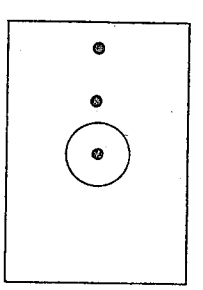
Figure 12:
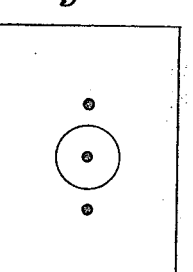

No. 620,875. Patented Mar. 14, 1899.
G. C. BAKER.
PROJECTILE.
(Application filed Feb. 1, 1898.)

(No Model.) 2 Sheets—Sheet 1.

Witnesses:-
William Crossley
Robert Forfett

Inventor
Gerald Connell Baker
per Hughes & Young
Attorneys.

No. 620,875. Patented Mar. 14, 1899.
G. C. BAKER.
PROJECTILE.
(Application filed Feb. 1, 1898.)
(No Model.) 2 Sheets—Sheet 2.
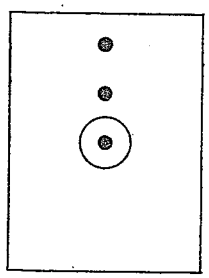
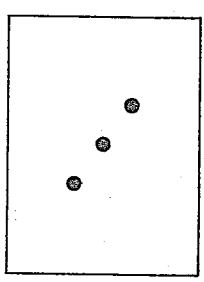
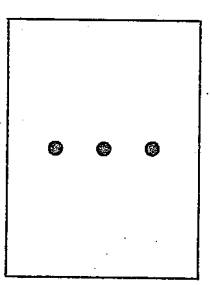
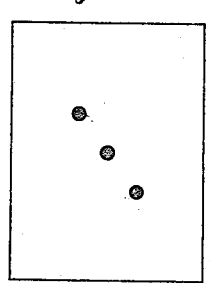
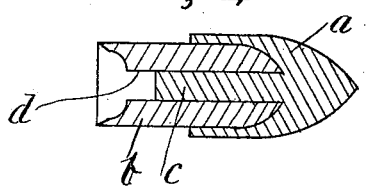
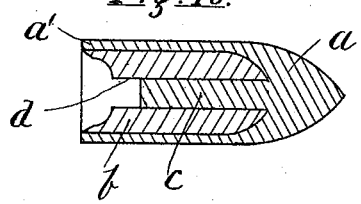
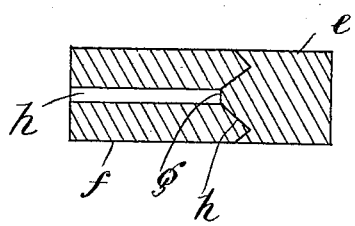
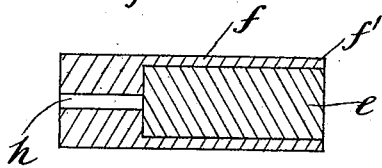
Witnesses:-
William Crossley.
Robert Farfitt.
Inventor
Gerald Connell Baker
per Hughes & Young
Attorneys.

UNITED STATES PATENT OFFICE.

GERALD CONNELL BAKER, OF LONDON, ENGLAND.

PROJECTILE.

SPECIFICATION forming part of Letters Patent No. 620,875, dated March 14, 1899.

Application filed February 1, 1898. Serial No. 668,740. (No model.)

*To all whom it may concern:*

Be it known that I, GERALD CONNELL BAKER, residing at 39 Victoria street, Westminster, London, England, have invented a new and Improved Type of Multiple Projectile and System of Gunnery, of which the following is a specification.

My invention is intended more especially to permit of a projectile being formed into two or more complete parts or projectiles and then being combined together as one complete projectile and when fired together from the barrel of a firearm to become separate projectiles, each proceeding on a different and yet regular course of flight, so that more opportunity may be given to strike the object aimed at than is the case with the usual single projectile or with previous forms of multiple projectiles.

The invention therefore includes not only a new form of projectile and improved method of applying projectiles together to carry out these purposes, but a new and improved system of gunnery, and as the invention embraces a number of types, patterns, combinations, actions, and methods of application I propose to distinguish the whole as the "multisystem" of gunnery.

In the accompanying drawings, Figures 1 to 16 are diagrams of the effects of my projectile on targets, and Figs. 17 to 20 are longitudinal sections of the typical arrangements and kinds of my projectile.

The theory on which is based this new system of projection and which appears to have escaped all previous attention is that different values of area and weight acted on by the same degree of propelling force should bring about varieties in speed and trajectory. This theory does not, however, fully explain the action of the projectile in separating into distinct projectiles, as, if so designed, they wait upon each other during the process of projection while in the weapon; but when required to act more especially as intended by this invention each separate projectile is impelled independently of the other or others and in the same way as they would do if each were fired off from a weapon singly.

There have already been multiple projectiles designed to introduce a somewhat similar system of gunnery as is now provided by this invention; but in every case the intention has been either for the separate projectiles to scatter in irregular order like shot from a shotgun or the projectiles are burst apart during flight after leaving the weapon by separate charges of explosive provided in the complete projectile, the accuracy of shooting being thus destroyed. In this new system of projection, however, each component part of the complete projectile is directly acted on by the gaseous propelling force while in the weapon, with the result that they naturally become separated from each other and without any violence, accuracy of shooting being thus strictly maintained in all the projectiles notwithstanding that each proceeds on its own course of elevation and in a vertical, diagonal, or horizontal direction as regards the other or others of them as may be required.

The action of the projectile in spreading in a regular manner very much depends on its accurate application and the accuracy of the weapon, and this action is carried out in a great variety of dispositions and this very readily. The spread for military purposes should in preference be in a vertical line, so that each part of the projectile may proceed on different courses of elevation, and when so proportioned for carrying out this purpose they strike an object as shown in Fig. 1, and the spread may be varied to any extent, as shown in Figs. 2, 3, 4, and 5, and the same pattern of projectile which hits the smaller bull's-eye of a target used at short ranges will hit the larger bull's-eye used for long ranges in the same way. (See Figs. 6 and 7.) Therefore the projectile acts in a very accurate and regular manner. It will therefore be understood that at long ranges where there is more likelihood of the usual single projectile missing the object aimed at through incorrect elevation of the weapon this multiple projectile allows a wide margin for incorrect elevation before touch is lost of the object, and assuming the diameter of the bull's-eye on the target to be the unit of measurement for this increased margin of elevation it is found that if the projectile is of duplex pattern (a projectile having two parts) this margin is three times the diameter, Fig. 8, and if of triplex pattern this margin is five times the diameter, Fig. 9, as compared with only one diameter in the case of the usual single projectile, Fig. 10. Further, each projectile can be directed to strike a particular point, such as the center of the bull's-eye, with equal certainty to that attending the use of the ordinary single projectile. (See Figs. 11, 12, and 13.)

With reference to the application of the invention to various patterns of firearms it should be understood that although it may be readily applied to all firearms it does not follow that the arrangement (as regards the areas, shapes, weights, and proportions of the projectiles which together constitute the complete projectile) which would suit one pattern of weapon would equally suit another, nor is the same pattern of spread between the projectiles carried out by all firearms or in the same manner, as there are two methods of effecting this spread—either by the rear projectile being projected under the foremost, which is the underthrow method, or above the foremost, which is the overthrow method. The spread is also effected by any drift of the projectile and jump of the weapon, and it may not be perpendicular in consequence; but these usual causes for deviation are rather matter of detail and can be employed in varying the use to which the projectile is put. For instance, with the revolver-pistol the hits can most readily be made either diagonally or horizontally, as well as vertically, (see Figs. 14, 15, and 16,) and the spread decreased or increased at will.

With reference to the ranging power of the projectile it has been found that as each separate part of the projectile is directly acted upon by the propelling gases a complete projectile of the same weight as the usual single projectile is with the same degree of propelling force projected from the weapon at increased speed and that if double the weight is required to be used only a slight increase in the propelling force is necessary to maintain the same muzzle velocity as that of the usual single projectile. In the former way of employing the invention it is more adapted for sporting purposes, while the latter way gives a range power equal to that of the usual single projectile employed for military purposes. The latter method therefore makes the invention particularly suitable for machine and quick-firing guns, as two or three times the number of projectiles can be fired from the one barrel without unduly heating the weapon, whereas if the same number of the usual single projectiles were fired from the one barrel in the same time the weapon would soon become too hot for use.

As typical examples of the projectiles for carrying into effect my new system of gunnery I instance those shown in longitudinal section by Figs. 17, 18, 19, and 20.

In the arrangement shown by Fig. 17 the projectile consists of two parts $a$ and $b$, $b$ being partly shrouded by $a$. The cross-sectional area of the rear of $a$, which is presented to the propulsive or impelling forces, is greater than that of $b$, and this variation enables the parts $a$ and $b$ to separate from one another by the action of gases generated by a charge of gunpowder in a weapon or by those gases or any similar propelling forces, such as compressed air, being allowed to come in contact with the base end of the projectile.

In Fig. 17 the part $a$ is kept in axial alinement with $b$ by the spindle $c$ entering the hole $d$ in $b$, and such holes may also serve the purpose of regulating the cross-sectional area of that part of the projectile in which they are provided.

Fig. 18 is of the same type as Fig. 17; but in this example the part $a$ is prolonged to $a'$, thus enshrouding the part $b$.

In Fig. 19 the parts $e$ and $f$ are fitted together by the spindle $g$ entering the cavity $h$ provided in $f$ and acting as a gas-channel and for the regulation of the cross-sectional area of $f$.

Fig. 20 is of the same type as Fig. 19; but the part $f$ by prolongation to $f'$ enshrouds the part $e$. In this case also the hole $h$ also acts as a gas-channel and may be used as a means for regulating the area of $f$, so as to insure the separation of the component parts of the projectile.

I would here point out that in order to insure the separation of the component parts it is essential that the cross-sectional areas of the rearward end of each part be less than that of the rearward end of the part immediately in advance of it. Otherwise, however loosely the combination may be put together, they will not separate during flight.

The holes in the projectiles shown in Figs. 17, 18, 19, and 20 are subject to all possible variation in cross-sectional area and in their application to one or more of the component parts of the projectile. The diameter, shape, weight, and length of the component parts are also subject to endless variations to suit different weapons or actions, which need not, however, affect the outward appearance of the projectile. The result of varying the extreme cross-sectional area and the diameter of the component parts and the area of the holes, and also the weight and shapes and lengths of the parts, is that in case of the areas, diameters, and holes their use has more connection with the projectiles' behavior in the weapon, whereas the variation in weight, shape, and length has more effect on the action of the projectiles after leaving the weapon.

As regards the movement of the component parts of the projectile before leaving the weapon, I have proved by actual experiments with my invention that a gaseous propelling force implanted into a larger cross-sectional area creates more speed than it does in a lesser area. Therefore by regulating the areas of the projectiles and permitting the gaseous force to act on each different area the force will plant in each its proportionate degree of speed almost entirely irrespective of the weight or shape of the projectile preventing such different areas to be acted upon. In this way each projectile forming the complete multiple projectile may be separately projected and final separation can be regulated to take place either in the weapon, at the muzzle of it, or just outside it, as the force does not cease to act on the projectile until it (the projectile) gets some distance from the muzzle, and, on the contrary, should it be required that one component part should not separate from another part, but the whole be projected together, an equality of area between such parts of excess of area in rear of another binds both parts together, as the force then becomes indirectly applied to that part which is in front of the other having the greater area.

I am aware that projectiles composed of separate component parts have been already employed to scatter themselves during their flight; but none of them have provided for carrying into practice the particular system of separate projection in and from the weapon embraced in and provided for by this invention.

What I claim as my invention, and desire to secure by Letters Patent, is—

1. Projectiles consisting essentially of two separable component parts having coincident axes, namely, a fore part with a hollow open-ended rear: an after part to enter the said open-ended rear of the fore part: an axial spindle on the fore part and an axial hole in the after part to receive the said spindle; one of the said component parts having a greater cross-sectional area at its base than has the base of the other of the said parts, substantially as described.

2. Projectiles consisting essentially of separable component parts having coincident axes, the said parts more or less fitting within or into one another the cross-sectional area presented to the impelling force by the rearward end of one part being less than the cross-sectional area of the rearward end of the part into which it fits, substantially as described.

GERALD CONNELL BAKER.

Witnesses:
HENRY L. WESTON,
HENRY LLEWELLYN WESTON,
EDMUND JOHN TURNER.